United States Patent [19]

Ott

[11] 4,332,609
[45] Jun. 1, 1982

[54] FERTILIZING PLANTS WITH POLYBORATES

[75] Inventor: Louis E. Ott, Oswego, Ill.

[73] Assignee: Standard Oil Company (Indiana), Chicago, Ill.

[21] Appl. No.: 240,888

[22] Filed: Mar. 5, 1981

[51] Int. Cl.$^3$ ................................................ C05G 1/00
[52] U.S. Cl. ........................................ 71/27; 71/28; 71/33; 71/53; 71/63; 71/DIG. 2
[58] Field of Search ...................... 71/1, 11, 27, 28–30, 71/33, 48, 53, 63, DIG. 2

[56] References Cited

FOREIGN PATENT DOCUMENTS 1522416 8/1978 United Kingdom .

OTHER PUBLICATIONS

Besekau et al.; Nitrogen Containing Fertilizer, Chem. Abstract #26886, vol. 83, 1975.

*Primary Examiner*—S. Leon Bashore, Jr.
*Assistant Examiner*—Ferris H. Lander
*Attorney, Agent, or Firm*—William T. McClain; William H. Magidson; Philip L. Bateman

[57] ABSTRACT

A liquid fertilizer comprises a polyborate compound. The polyborate compound is formed by reacting a boric acid compound with an alkanolamine or an aliphatic polyamine.

13 Claims, No Drawings

FERTILIZING PLANTS WITH POLYBORATES

FIELD OF THE INVENTION

This invention relates to a process of fertilizing plants with polyborates comprising the reaction product of a boric acid compound and an alkanolamine or an aliphatic polyamine. This invention also relates to fertilizer compositions containing these polyborate compounds.

BACKGROUND OF THE INVENTION

Plants require a variety of elements for adequate nutrition. The essential elements carbon, hydrogen, and oxygen are provided by carbon dioxide and water, materials which are usually available in adequate amounts from both the soil and the atmosphere. The supply of carbon dioxide and water is continually replenished by natural phenomena.

Thirteen other elements are known to also be essential to plant nutrition. These elements are normally drawn from the soil. If the soil nutrient supply is deficient, the application of fertilizer is necessary. Of these thirteen elements, nitrogen, phosphorus, and potassium are needed by plants in relatively large quantities and are accordingly called the macronutrients. Calcium, magnesium, and sulfur are generally required in lesser, though still substantial, amounts and are classified as secondary nutrients. The remaining seven elements are known as micronutrients since they are required in very small amounts for plants growth. These seven are iron, manganese, copper, zinc, molybdenum, chlorine, and boron.

The element boron functions as a regulator in the plant metabolism of carbohydrates. A boron deficiency causes a degeneration of meristematic tissue associated with a restriction in terminal growth; thickened, wilted or curled leaves; thickened, cracked or water-soaked petioles and stems; and discolored, cracked or rotted fruit, tubers, and roots. While a boron deficiency is obviously deleterious, an excess can also be harmful. Plants vary in their responses to both shortages and excesses of boron.

There are, of course, hundreds of known boron compounds, but most cannot be used by the plant as a source of elemental boron since, to serve as a boron source, the compound must supply the boron in a form which is both water-soluble and capable of passing through plant membranes. Sodium tetraborate, $Na_2B_4O_7.10\ H_2O$, is one boron compound which is known to supply elemental boron to plants. It is also the most widely used boron fertilizer. Sodium tetraborate, commonly known as either borax or sodium borate, is a dry solid and contains about 11 weight percent boron. Sodium tetraborate can be applied to the soil in several ways, all of which present difficulties.

First of all, sodium tetraborate can be applied by itself as a dust to the soil or foliarly to the plants. However, the recommended treatment is usually only a few pounds per acre and it is very difficult to evenly distribute such a small amount over an acre. Therefore, when sodium tetraborate is used in dry form, it is generally mixed with other solid fertilizers. But problems of uniform incorporation and segregation after mixing still exist.

For the above reasons, it is often more convenient to handle sodium tetraborate in liquid solutions. Unfortunately, the solubility of sodium tetraborate in water is relatively low. Furthermore, its use is limited with the many standard liquid fertilizer solutions providing nitrogen in the ammonium form because of the formation of the relatively insoluble ammonium borates. Such standard liquid fertilizers include the "NPK solutions," which provide nitrogen, phosphorus, and potassium in varying proportions, and the ammoniated chelated micronutrient solutions, which are sources of iron, manganese, copper, and zinc.

To meet the need for a boron fertilizer which is more soluble in water and in NPK solutions, the United States Borax & Chemical Corporation sells a product called SOLUBOR ®. SOLUBOR ® is a partially dehydrated combination of sodium tetraborate and sodium pentaborate, $Na_2B_{10}O_{16}.10\ H_2O$. It contains about 21 weight percent boron. Although it sells at a premium over sodium tetraborate, SOLUBOR ® is widely preferred because of its increased solubility in water, in NPK solutions, and in ammoniated chelated micronutrient solutions.

However, a need still exists for a boron fertilizer which is even more soluble in water, in NPK solutions, and in ammoniated chelated micronutrient solutions.

Anger, Belgian Pat. No. 842,649, which is incorporated by reference, discloses a new class of water-soluble polyborates formed by the reaction of boric acid with an alkanolamine or an aliphatic polyamine. The preferred alkanolamines are monoethanolamine and aminoisopropanol. The preferred aliphatic polyamine is triethylene-tetraamine. Anger notes that such aqueous polyborate solutions can be used as thread impregnation agents, as refrigeration agents, as liquid purification agents, and as disinfection agents. There is no suggestion that any of these solutions might have an agricultural use as a boron fertilizer.

SUMMARY OF THE INVENTION

One object of this invention is to provide an improved means of applying boron as a fertilizer. Another object is to provide improved boron-containing fertilizer compositions.

I have discovered that polyborates comprising the reaction product of a boric acid compound and an alkanolamine or an aliphatic polyamine can be used as a boron fertilizer. These polyborate compounds provide the element boron in a form which can be utilized by the plant. These compounds are also more soluble in water, in NPK solutions, and in ammoniated chelated micronutrient solutions than either sodium tetraborate or SOLUBOR ®.

DETAILED DESCRIPTION OF THE INVENTION

The polyborate feritlizers used in this invention comprise the reaction product of a boric acid compound with an alkanolamine or an aliphatic polyamine. Since boric acid loses water in stages, the term is intended to include four compounds: orthoboric acid, $H_3BO_3$; metaboric acid, $HBO_2$; pyroboric acid, $H_2B_4O_7$; and boric oxide $B_2O_3$. The orthoboric form is the standard of commerce. The term "boric acid compound" is also intended to include mixtures containing at least one of these four compounds.

The amines which are suitable for use in this invention include the alkanolamines and the aliphatic polyamines. The alkanolamines are preferred because the polyborates formed therefrom are more water-soluble than the polyborates formed from the aliphatic polyamines.

Suitable alkanolamines include monoethanolamine, diethanolamine, triethanolamine, 1-amino-2-propanol, 1-amino-2-butanol, etc. The preferred alkanolamine is monoethanolamine for two reasons. First of all, monoethanolamine is the least expensive. Secondly, it is the simplest alkanolamine and has the lowest molecular weight. This means that, for a solution containing a given number of moles of alkanolamine, the use of monoethanolamine permits more boric acid and/or solvent to be used.

Suitable aliphatic polyamines include 1,2-diaminoethane (ethylenediamine), 1,2-diamino-propane, and triethylenetetraamine. The preferred aliphatic polyamine is 1,2-diamino-ethane because it is the least expensive and simplest aliphatic polyamine.

The molar ratio of the boric acid compound to the amine, is not critical in the sense that the polyborates will be formed whenever the two reactants are brought into contact. However, for use as a liquid fertilizer it is generally desired that the polyborates be in solution and that the solution contain as much boron as possible. Therefore, the preferred molar ratios are within a limited range.

For example, when monoethanolamine is used as the amine, the preferred molar ratio of boric acid to monoethanolamine is from about 1:1 to about 6:1 and the more preferred molar ratio is from about 2.5:1 to about 3.5:1. If the molar ratio is less than about 1:1 or greater than about 6:1, either the monoethanolamine polyborate will not be in solution or else the solution will contain relatively little boron.

In general, reaction conditions and order of addition of reactants are not critical to the formation of the polyborates. The reaction itself is mildly exothermic so some cooling may be necessary depending on the desired temperature of the product and the initial temperature of the reactants. It is preferable to add the boric acid compound to the amine rather than vice versa in order to avoid congealing problems. If monoethanolamine is used as the amine, its freezing point of 51° F. could cause problems in preparing polyborates outdoors in cool weather. To avoid the problem of a high freezing point, monoethanolamine is sold commercially as 85 percent monoethanolamine and 15 percent water.

Once the polyborates have been prepared, they may be used to fertilize plants in several different ways. First of all, they can be applied undiluted, either directly to the soil or foliarly to the plants. Secondly, the polyborates can be diluted or dissolved in water before application. And finally, the polyborates can be added to another liquid fertilizer before application.

The number of liquid fertilizers to which these polyborates can be added is unlimited. The fertilizers include any liquid containing a plant nutrient compound, i.e., a compound capable of supplying the plant with at least one of the thirteen essential nutrients, namely, nitrogen, phosphorus, potassium, calcium, magnesium, sulfur, iron, manganese, copper, zinc, molybdenum, chlorine, and boron. When added to a liquid fertilizer, the polyborates will generally constitute a minor amount of the total plant nutrient compounds, since boron is required in relatively small amounts by plants. However, if the liquid fertilizer is one supplying a micronutrient, such as iron, manganese, copper, or zinc, the polyborates will often constitute a major amount of the total plant nutrient compounds. It is understood that the solubility of the polyborates will vary depending upon the particular liquid fertilizer used.

Examples of plant nutrient compounds which supply nitrogen include ammonia, urea, ammonium nitrate, ammonium sulfate, ammonium sulfide, ammonium sulfite, ammonium thiosulfate, ammonium thiosulfide, ammonium polysulfide, ammonium chloride, sodium nitrate, calcium nitrate, calcium cyanamide, etc.

Phosphorus-supplying compounds include the calcium phosphates, such as monocalcium phosphate and dicalcium phosphate, and the ammonium phosphates, such as monoammonium phosphate and diammonium phosphate. Potassium-supplying compounds include the salts of potassium, such as potassium chloride, potassium sulfate, potassium nitrate, and potassium phosphate.

Calcium-supplying compounds, in addition to those already mentioned, include the salts of calcium, such as calcium carbonate and calcium sulfate. Magnesium-supplying compounds include the salts of magnesium, such as magnesium carbonate and magnesium sulfate. Sulfur-supplying compounds, in addition to those already mentioned, include elemental sulfur.

Iron-supplying compounds include the salts of iron, such as iron sulfate, and the various coordination compounds of iron. These coordination compounds include complexes with monofunctional ligands, such as ammonia, and complexes with multifunctional ligands, or chelates, such as citric acid, ethylenediaminetetraacetic acid (EDTA), and the lingno sulfonates. Similarly, manganese-supplying compounds include the salts of manganese and the manganese coordination compounds. Copper-supplying compounds include the salts of copper and the copper coordination compounds. Zinc-supplying compounds include the salts of zinc and the zinc coordination compounds.

Molybdenum-supplying compounds include the salts of molybdenum, such as sodium molybdate. Chlorine-supplying compounds include the salts of chlorine, such as sodium chloride. Boron-supplying compounds include the salts of boron, such as sodium tetraborate and sodium pentaborate, as well as the polyborates of this invention.

The amount of polyborate which should be applied to a given field will depend on at least four factors: (1) the weight percent boron in the polyborate, (2) the type of plant, (3) the amount of boron in the soil, and (4) the economic return anticipated. Generally, the polyborate is added in an amount from about 0.1 to about 6.0 pounds of boron per acre. The farming literature is filled with recommended boron addition rates for various plants and for various regions of the country. Thus, one skilled in the art can readily determine the optimal amount of polyborate to add to a given field.

The following examples are illustrative only.

EXAMPLE 1

This example illustrates a method of preparing a polyborate solution of this invention.

The solution was prepared in a reactor equipped with a stirrer and suitable cooling means. The following reactants were added in order at 70° F.: 22.28 parts by weight of water, 20.00 parts by weight of monoethanolamine, and 57.72 parts by weight of boric acid. Stirring was continued until all the boric acid had dissolved. The resulting monoethanolamine polyborate solution contained 10 weight percent boron and had a molar ratio of boric acid to monoethanolamine of 2.85 to 1.

EXAMPLE 2

This example illustrates that the polyborate solutions of this invention provide the element boron in a form which can be utilized by the plant.

A monoethanolamine polyborate solution was prepared as in Example 1. In addition, an aqueous solution of SOLUBOR ® was prepared for comparison purposes.

Soil which was deficient in boron, but adequate in other nutrients, was planted in corn. When the corn was approximately 12 inches tall, the two boron solutions were foliarly applied. The comparison areas were treated with 0, 1, 2, or 4 pounds of boron per acre in 20 gallons of spray water.

After one week of exposure, samples of the whorl leaves of the corn were taken. The samples were washed and analyzed for plant boron level in the tissue. The results, shown in Table I, indicate that the increase in boron uptake at the 4 pound treatment level was 9.3 ppm with monoethanolamine polyborate and only 6.5 ppm with SOLUBOR ®.

TABLE I

| Treatment Level (Lbs. boron per acre) | Boron Uptake in Corn Boron Level in Plant Tissue (PPM) | |
|---|---|---|
| | Monoethanolamine Polyborate | SOLUBOR$^R$ |
| 0 | 8.2 | 8.9 |
| 1 | 11.8 | 10.4 |
| 2 | 13.7 | 12.6 |
| 4 | 17.5 | 15.4 |

EXAMPLE 3

This example illustrates that the polyborate compounds of this invention are more soluble in water than either sodium tetraborate or SOLUBOR ®.

A monoethanolamine polyborate solution was prepared as in Example 1. The solution became saturated when cooled to 32° F. Saturated solutions were also prepared using sodium tetraborate and SOLUBOR ®. Table II shows the amount of boron in the respective saturated solutions.

TABLE II

| Amount of Boron in Saturated Aqueous Solutions at 32° F. | |
|---|---|
| Source of Boron | Amount of Boron (Wt. %) |
| Monoethanolamine Polyborate | 10.0 |
| SOLUBOR$^R$ | 0.5 |
| Sodium tetraborate | 0.2 |

EXAMPLE 4

This example illustrates a novel fertilizer composition of this invention. It also illustrates that the polyborate compounds of this invention are more soluble in NPK solutions than either sodium tetraborate or SOLUBOR ®.

A monoethanolamine polyborate solution was prepared as in Example 1. The NPK solution was a commercially available fertilizer containing 7 weight percent nitrogen, 23 weight percent phosphate ($P_2O_5$), and 5 weight percent potassium oxide ($K_2O$). A saturated solution of the polyborate in the NPK solution was prepared at 70° F. The amount of boron in this solution is shown in Table III along with corresponding data for sodium tetraborate and SOLUBOR ® from the literature.

TABLE III

| Amount of Boron in Saturated 7-23-5 NPK Fertilizer at 70° F. | |
|---|---|
| Source of Boron | Amount of Boron (Wt. %) |
| Monoethanolamine Polyborate | 1.6 |
| SOLUBOR$^R$ | 1.0 |
| Sodium tetraborate | 0.5 |

EXAMPLE 5

This example illustrates a novel fertilizer composition of this invention. It also illustrates that the polyborate solutions of this invention are more soluble in ammoniated chelated micronutrient solutions than SOLUBOR ®.

A monoethanolamine polyborate solution was prepared as in Example 1. An ammoniated zinc citrate solution was prepared by reacting together 12.5 parts by weight of zinc oxide, 22 parts by weight of citric acid, 9.8 parts by weight of ammonia, and 55.7 parts by weight of water. The resulting zinc solution contained 10 weight percent zinc.

A polyborate-zinc solution was prepared by adding 50 parts by weight of the polyborate solution to 50 parts by weight of the ammoniated zinc citrate solution. The resulting solution contained 5 weight percent boron and 5 weight percent zinc.

A SOLUBOR ®-zinc solution was prepared by adding together 25 parts by weight of SOLUBOR ®, 25 parts by weight of water, and 50 parts by weight of the ammoniated zinc citrate solution. The resulting solution also contained 5 weight percent boron and 5 weight percent zinc.

The polyborate-zinc and SOLUBOR ®-zinc solutions were maintained at 70° F. and observed. The results are shown in Table IV.

TABLE IV

| Effect of Source of Boron on Physical Properties of 5 Wt. % B, 5 Wt. % Zn Ammoniated Zinc Citrate Solutions | |
|---|---|
| Source of Boron | Observations at 70° F. |
| Monoethanolamine Polyborate | Clear solution |
| SOLUBOR$^R$ | Pasty liquid |

EXAMPLE 6

This example illustrates the effect of the molar ratio of boric acid to monoethanolamine (MEA) on the physical properties of the polyborate solution. This example also illustrates that the preferred molar ratio of boric acid to MEA is between 2:1 and 4:1.

Four monoethanolamine polyborate solutions were prepared, each with a different molar ratio. Each solution contained 10 weight percent boron. The solutions were maintained at 70° F. and observed. The results are shown in Table V.

TABLE V

Effect of Molar Ratio on Physical Properties

| Formulation (Wt. %) | | | Molar Ratio (Boric Acid to MEA) | Observations at 70° F. |
|---|---|---|---|---|
| Boric Acid | MEA | Water | | |
| 57.2 | 42.8 | 0.0 | 1.3 | Pasty solid |
| 57.2 | 28.2 | 14.6 | 2.0 | Pasty liquid |
| 57.2 | 18.8 | 24.0 | 3.0 | Clear solution |
| 57.2 | 14.1 | 28.7 | 4.0 | Crystals present |

EXAMPLE 7

This example illustrates the effect of the selection of the alkanolamine on the physical properties of the polyborate solution. This example also illustrates that the preferred alkanolamine is monoethanolamine (MEA).

Three polyborate solutions were prepared using three different alkanolamines: monoethanolamine (MEA), diethanolamine (DEA), and triethanolamine (TEA). Each solution had a molar ratio of boric acid to alkanolamine of 2.8 to 1. The solutions were maintained at 70° F. and observed. The results are shown in Table VI.

TABLE VI

Effect of Alkanolamine Selection on Physical Properties

| Formulation (Wt. %) | | | | | Amount of Boron (Wt. %) | Observations at 70° F. |
|---|---|---|---|---|---|---|
| Boric Acid | MEA | DEA | TEA | Water | | |
| 57.2 | 20.2 | 0 | 0 | 22.6 | 10.0 | Clear solution |
| 57.2 | 0 | 34.8 | 0 | 8.0 | 10.0 | Pasty liquid |
| 53.8 | 0 | 0 | 46.2 | 0 | 9.4 | Pasty solid |

I claim:

1. A method of fertilizing plants which comprises the application of a polyborate compound which comprises the reaction product of a boric acid compound with at least one amine selected from the group consisting of alkanolamines and aliphatic polyamines.

2. The method of claim 1 wherein the amine is an alkanolamine.

3. The method of claim 2 wherein the alkanolamine is at least one selected from the group consisting of monoethanolamine, diethanolamine, triethanolamine, 1-amino-2-propanol, and 1-amino-2-butanol.

4. The method of claim 2 wherein the alkanolamine is monoethanolamine and the molar ratio of the boric acid compound to monoethanolamine is from about 1:1 to about 6:1.

5. The method of claim 4 wherein the molar ratio of the boric acid compound to monoethanolamine is from about 2.5:1 to about 3.5:1.

6. The method of claim 5 wherein the polyborate compound is applied in an amount from about 0.1 to about 6.0 pounds of boron per acre.

7. A fertilizer composition comprising: (a) a polyborate compound which comprises the reaction product of a boric acid compound with at least one amine selected from the group consisting of alkanolamines and aliphatic polyamines; and (b) another plant nutrient compound.

8. The composition of claim 7 wherein the polyborate compound constitutes a minor amount of the total plant nutrient compounds.

9. The composition of claim 7 wherein the amine is monoethanolamine and the molar ratio of the boric acid compound to monoethanolamine is from about 1:1 to about 6:1.

10. The composition of claim 9 wherein the molar ratio of the boric acid compound to monoethanolamine is from about 2.5:1 to about 3.5:1.

11. The composition of claim 10 wherein the other plant nutrient compound is at least one selected from the group consisting of nitrogen-supplying compounds, phosphorus-supplying compounds, and potassium-supplying compounds.

12. The composition of claim 10 wherein the other plant nutrient compound is at least one selected from the group consisting of citric acid chelates of iron, manganese, copper, and zinc.

13. The composition of claim 12 wherein the polyborate compound constitutes a major amount of the total plant nutrient compounds.

* * * * *